United States Patent [19]

Koberstein

[11] Patent Number: 5,359,824
[45] Date of Patent: Nov. 1, 1994

[54] SLOTTED BOLT SEAT FASTENING DEVICE

[75] Inventor: Michael L. Koberstein, Murphysboro, Ill.

[73] Assignee: GS Metals Corp., Pinckneyville, Ill.

[21] Appl. No.: 974,096

[22] Filed: Nov. 10, 1992

[51] Int. Cl.⁵ .............................. E04C 2/42; F16B 2/12
[52] U.S. Cl. ...................................... 52/507; 411/148; 411/531
[58] Field of Search ................. 52/507, 489, 582, 584, 52/418, 507; 403/388; 411/147, 148, 531

[56] References Cited

U.S. PATENT DOCUMENTS

| | | | |
|---|---|---|---|
| 2,632,533 | 3/1953 | MacKenzie | 52/633 |
| 2,990,920 | 7/1961 | Hoffman | 52/633 |
| 3,077,960 | 2/1963 | Lang. | |
| 3,742,671 | 7/1973 | Ellis | 52/507 |
| 4,179,038 | 12/1979 | Rosan. | |
| 4,416,554 | 11/1983 | Pribbenow. | |
| 4,941,769 | 7/1990 | Natsume | 403/388 |
| 5,118,147 | 6/1992 | Correll | 52/507 |

Primary Examiner—James L. Ridgill, Jr.
Attorney, Agent, or Firm—Welsh & Katz, Ltd.

[57] ABSTRACT

A fastening apparatus and method for securely connecting a platform structure to a support element. A non-circular aperture is formed by joining two adjacent holes in an apertured platform structure. A seat element is provided, having a flat portion surrounding an aperture, the aperture in the seat element being configured in substantially the same shape as the non-circular aperture in the platform. A flange extends substantially downward from the rim of the aperture in the seat element. The outer surface of the flange bears against an inner rim of the aperture in the platform structure to prevent relative movement between the seat element and the platform structure. A bolt and nut assembly is inserted through the aperture in the platform and the seat element, through corresponding apertures in the support element, and tightened to securely fasten the platform to the support element in a structure that prevents lateral movement of the platform relative to the support element.

5 Claims, 2 Drawing Sheets

SLOTTED BOLT SEAT FASTENING DEVICE

The present invention relates generally to an improved fastening device, and in particular to a slotted bolt seat for connecting a stamped or other metal formed grating or platform to a mounting bracket, such as a cantilever mounting bracket.

BACKGROUND OF THE INVENTION

Catwalks, scaffolding, and other weight-bearing support structures are to a great extent formed from metal gratings or platforms, which comprise a perforated pattern of holes, such as circular holes, throughout their surface to lessen the weight of the structure, while not significantly decreasing the structure's ability to support a predetermined load. Some support structures are formed using cold-metal fabricating techniques, wherein the pattern of holes are formed in a given sequence, with regular spacing between the holes in the platform.

It is preferable to support such platforms from the side walls of buildings and other structures, so as to maintain the areas above and below each platform free of obstructions. This allows for the unimpeded movement of other mechanical devices in the area of the platform, such as overhead cranes, fork-lift trucks, and automatic inventory and storage facilities, by way of example. Previously, to provide proper support for platforms such as catwalks, vertical struts extending from the floor to the platform, or from the ceiling to the platform, have been used. Obviously, these vertical struts interfere with the freedom of movement of other devices being employed in the same building. To maximize the amount of usable open space available in a building of the type described, it is preferable to support catwalks and other platform structures from a vertical sidewall using a cantilever or right-angle bracket attached to the sidewall, with the platform rigidly fastened to the bracket.

When a person walks across a platform of the type described, lateral or horizontal forces are created between the platform and the elements used to fasten the platform to the supporting brackets. These horizontal forces are in addition to the vertical loads acting on the platform and its supporting brackets. For example, walking across the platform causes a tendency for the platform to shift laterally relative to its support elements.

Assuming the platform is fastened to a supporting bracket by a bolt extending through one of the holes in the platform, if the outer diameter of the bolt is less than the inner diameter of the hole in the platform through which the bolt extends, the lateral forces caused by walking across the platform result in lateral shifting between the platform, the bolt, and the support brackets. This eventually could lead to shearing of the bolt, weakening a portion of the platform itself, and ultimate failure of the connection between the platform and the support bracket. The possibility of such failure in prior platform devices is high, since it is not realistic or practical to assume that bolts will be found having the same diameter as the platform holes or apertures through which they extend.

Therefore, it is a primary object of the present invention to provide a fastening apparatus between a platform, such as a catwalk, and a support bracket which will hold the platform secure against the support bracket when the platform is subjected to lateral shifting forces.

A further object of the present invention is to provide a slotted bolt seat assembly providing a secure fastening system between a reticulated platform, a bracket supporting the platform, and a bolt tightly securing the bolt seat, the platform and the support bracket.

Another object of the present invention is to provide a slotted bolt seat which partially extends through an opening in the platform formed by removing material between two adjacent apertures in the reticulated platform, which opening also includes the two apertures, to form an elliptical or oblong aperture in which the bolt seat is lodged. The bolt seat reacts to lateral forces applied to the platform and holds the platform securely to the bracket.

Still another object of the present invention is to provide a slotted bolt seat assembly which is adapted to fit within a pre-fabricated mating slot in a platform to be supported from a bracket, whereby the pre-fabricated mating slot can be formed at substantially any location in the platform.

Yet another object of the present invention is to provide a method for securing an apertured platform structure to a support bracket by elongating and connecting two of the apertures in the platform to form an elongated or oblong aperture in the platform, inserting a bolt seat through the aperture, which bolt seat has a first portion seated flush against the upper surface of the platform and a second extensible portion which fits into and circumferentially engages the edges of the elongated aperture in the platform, inserting a bolt through the bolt seat, platform and bracket, and tightening a nut on the bolt to hold the bolt seat and platform securely against the support bracket. This method provides flexibility in the location where the bracket is attached to the platform.

SUMMARY OF THE INVENTION

These and other objects and advantages of the present invention are provided by an apparatus and method comprising removing material between two adjacent apertures in a platform in a region of the platform where it is desired to bolt the platform to a mounting bracket. The platform normally has regular and uniformly spaced apertures extending therethrough, whereby the removal of material between two adjacent apertures forms a new elongated aperture through the platform. The slotted bolt seat of the present invention is a generally flat elongated washer-type element, having an elongated inner aperture from which an elongated shaped flange element extends downwardly. The sides of the flange are proportioned so that they fit snugly against the edges or rim of the elongated aperture in the platform, whereby the bolt seat is held against lateral movement relative to the platform by the flange. A bolt is inserted through the bolt seat, platform, and an aperture in the supporting bracket. The head of the bolt engages the bolt seat, and a nut is threaded onto the bolt until the bolt seat, platform and mounting bracket are tightly and securely held together. When so assembled, the platform is securely held against horizontal shifting relative to the support bracket when lateral loads are applied to the platform by the engagement between the head of the bolt and the slotted bolt seat.

DETAILED DESCRIPTION OF THE INVENTION

Figure 1:
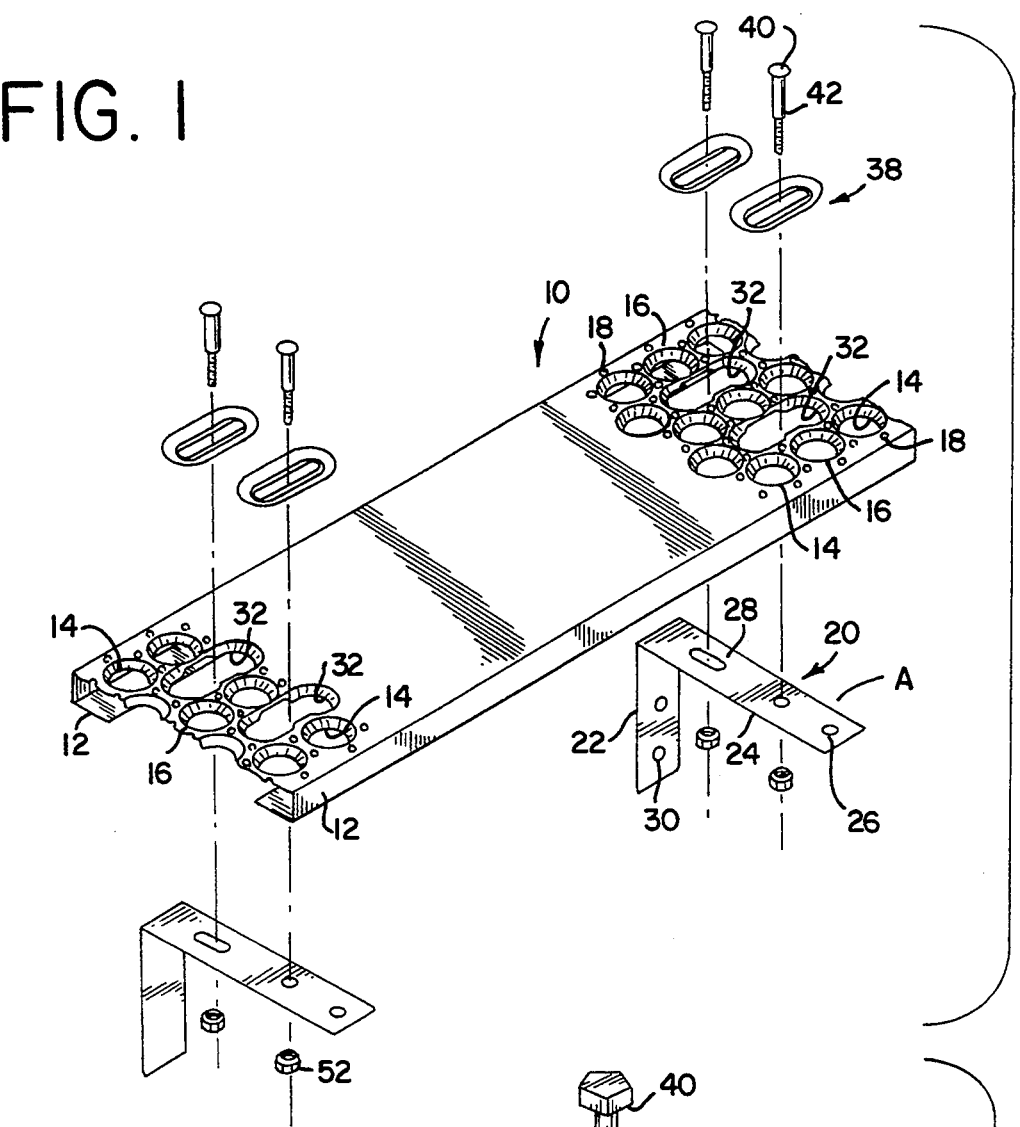
FIG. 1 is a perspective exploded view of the elements and assembly sequence of the present invention for securely fastening the platform to the mounting bracket, including the novel slotted bolt seats and elongated apertures formed in the platform through which a portion of each slotted bolt seat extends.

Referring to FIG. 1, a perforated grating or platform structure is generally designated by the numeral 10. The platform 10 includes downwardly and inwardly extending lateral flanges 12 on both sides to provide rigidity to the platform. Platform 10 is of the type normally provided with a plurality of countersunk or dimpled apertures 14 which may be circular in shape and are regularly spaced relative to one another, providing a an apertured pattern in the platform. Between each aperture 14 is a space 16 comprising the surface of the platform. Elevated hubs 18 may also be provided in platform 10 to provide a gripping surface for a person walking across the platform. Nubs 18 are normally inserted into holes extruded or otherwise formed in the platform.

The various elements of the present invention, when assembled as described below, are adapted to provide a means for supporting platform 10 from a vertical support structure (not shown) such as a wall of an industrial facility, warehouse, mobile equipment, railroad cars, trucks or the like, such that the platform is restrained against horizontal movement when lateral forces are applied to the platform. To this end, a mounting bracket 20 includes a vertically extending member 22 for attachment to a support wall and a horizontally extending member 24, with apertures 26, 28 extending through the horizontally extending member 24, to support platform 10. In the embodiment shown in FIG. 1, aperture 28 is shown slotted. However, the configuration and location of the apertures 26, 28 may vary, depending upon the location and spacing of the apertures 14 in platform 10. The vertical extending member 22 of the bracket 29 has suitable apertures 30 for securing the bracket to the vertical support structure (not shown).

Figure 2:
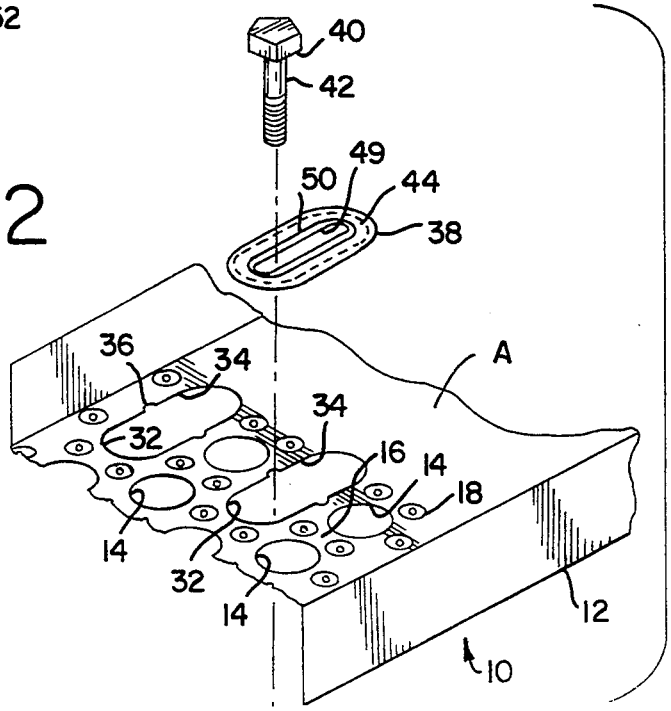
FIG. 2 is a detail perspective exploded view of a single bolt seat and bolt showing how these elements are to be inserted into an elongated aperture in the platform.

To provide the securing assembly contemplated by the present invention, a plurality of elongated, such as elliptical or oblong, apertures 32 are formed in the platform 10 by removing material in the spaces 16 between two adjacent apertures 14, and forming the sides of the elongated apertures 32 with substantially straight sides 34 (FIG. 2) that are tangent to the circumferences of apertures 14 from which elongated apertures 32 are formed. FIG. 2 shows elongated apertures 32 as they are formed in platform 10. Due to the presence of holes in the platform 10 through which nubs 18 extend, when the nubs 18 adjacent elongated aperture 32 are removed and the material in space 16 is eliminated, slight indentations 36 may interrupt the straight sides 34 of elliptical aperture 32. However, as will be described, the presence of indentations 36 has no effect on the efficient functioning of the presently disclosed support structure.

The present invention provides for the partial insertion of a novel slotted bolt seat 38 into each elongated aperture 32 to provide a bearing surface for the head 40 of a carriage bolt 42. The bolt 42 extends through slotted bolt seat 38, elongated aperture 32 in platform 10, and apertures 26, 28 in mounting bracket 20 to securely fasten platform 10 to mounting bracket 20, as will be explained.

Figure 3:
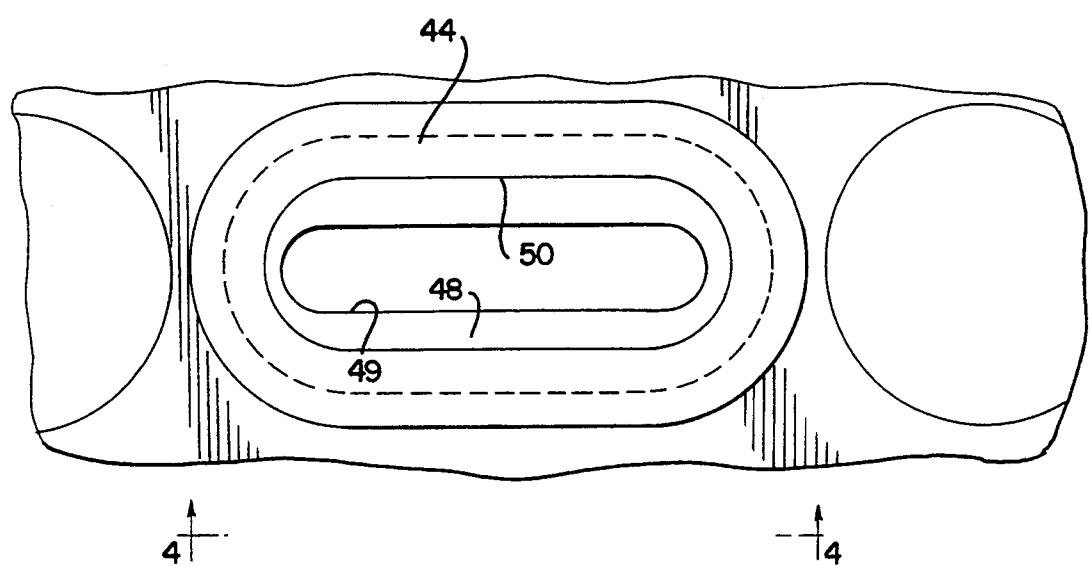
FIG. 3 is a plan view of the slotted bolt seat of the present invention showing the flanged portion inserted into the elongated aperture of the platform.
Figure 4:
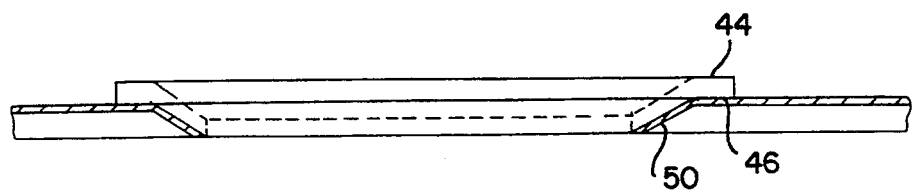
FIG. 4 is an elevation view taken along line 4—4 of FIG. 3.

The configuration of slotted bolt seat 38 is best seen with reference to FIGS. 3 and 4. The bolt seat 38 of the preferred embodiment is generally elongated in configuration, although it is contemplated that other configuration may also be suitable in keeping with the teachings of the present invention. The bolt seat 38 includes a substantially flat portion 44 that extends around the bolt seat. The underside 46 of bolt seat 38 provides a flat area which is adapted to fit against the upper surface of platform 10 when the bolt seat 38 is inserted into elongated aperture 32.

The inside of slotted bolt seat 38 includes a downwardly extending flanged portion 48 which also laterally extends around an elongated shaped rim 50 on the interior of bolt seat 38. The interior of flanged portion 48 forms an elongated shaped aperture 49 through slotted bolt seat 38. Flanged portion 48 also includes an outer surface 50 which is adapted to engage the edges of the elongated aperture 32 in the platform 10 when the bolt seat 38 is inserted into elongated aperture 32.

Prior to assembly of the fastening device of the above described invention, platform 10 is prepared by removing material from the spaces 16 between two adjacent apertures 14 to form elongated apertures 32 encompassing the two adjacent apertures. This is accomplished by cutting, grinding or routing procedures, or any other suitable method, such that the elongated apertures are formed with substantially straight sides 34. In the illustrated embodiment, elongated apertures 32 are shown having a major axis along the length of the platform 10. However, if desired, the elongated aperture 32 could be formed between two adjacent apertures 14 whereby the major axes of the elongated apertures runs in a direction paralleling the width of the platform.

To commence assembly of the support structure thus far described, a plurality of brackets 20 are mounted to a vertically extending support structure (not shown) by passing bolts through apertures 30 and securely fastening the brackets to the support structure such that members 24 of the brackets extend outward horizontally. The platform 10, prepared as described above, is placed on top of the members 24 of brackets 20 such that the horizontally extending portions of flanges 12 of the platform are seated on support extension member 24, and apertures 26 and 28 are beneath a respective elongated aperture 32.

Slotted bolt seats 38 are then inserted into each elongated aperture 32 such that the underside 46 of the flat portion 44 of each slotted bolt seat contacts and rests upon the surface of platform 10 surrounding the elongated aperture. Simultaneously, the outer rim 50 of the flanged portion 48 of each slotted bolt seat 38 engages the interior rim of each elongated aperture 32, including straight sides 34, such that each slotted bolt seat 38 fits firmly into its respective elongated aperture 32. When so inserted, there is no movement between each slotted bolt seat 38 and its respective elongated aperture 32 in platform 10.

As best seen in FIG. 2, a bolt such as carriage bolt 42 is inserted through aperture 49 in slotted bolt seat 38, through elongated aperture 32 in platform 10, and through corresponding aperture 26 or 28 in mounting bracket 20. A hex nut 52 (FIG. 1) is then threaded onto bolt 42 and tightened such that the head 40 of the bolt compresses flat portion 44 of bolt seat 38 firmly against the upper surface of platform 10, and simultaneously forces rim 5 of flanged portion 48 of the slotted bolt seat against the rim or margin formed at the edges of elongated aperture 32 in the platform. In this manner, slotted bolt seat 38 and platform 10 are firmly and securely held to mounting bracket 20. The elongated shape of flanged portion 48 and aperture 32 prevent relative movement between the bolt seat 38 and the platform 10 when the platform is subjected to lateral forces. In the structure of the present invention, bolt 42 can be of any size suitable to fit through apertures 26, 28, 32 and 49, without having any precise dimensions. The elongated shapes of aperture 32 and flanged portion 48 of bolt seat 38 hold the assembly against relative motion, regardless of the diameter of bolt 42.

While a preferred embodiment of the present invention has been illustrated and described, it will be understood to those skilled in the art that changes and modifications may be made therein without departing from the invention and its broader aspects. Various features of the invention are defined in the following claims.

I claim:

1. A fastening apparatus for securely connecting a platform structure to a support element comprising:
    a non-circular aperture in said platform structure, said non-circular aperture having an inner rim;
    a seat element having an aperture extending therethrough and a substantially flat portion surrounding said aperture, said aperture in said seat element conforming substantially to the configuration of the aperture in said platform structure, said substantially flat portion of said seat element having an underside adapted to bear upon an upper surface of said platform structure when said seat element is brought into contact with said non-circular aperture;
    said seat element further including flange means extending substantially downward from an inner rim of said aperture through said seat element, said flange means adapted to abut against said inner rim of said non-circular aperture in said platform structure when said seat element is brought into contact with said non-circular aperture; and
    fastening means extending through said apertures in said seat element and said platform structure, and extending through apertures in said support element to engage said seat element and said support element and hold said platform securely to said support element.

2. The fastening apparatus of claim 1 wherein an outer surface of said flange means of said seat element defines a bearing surface which abuts said non-circular aperture in said platform structure when said seat element is brought into contact with said platform structure and said flange means extends into said aperture in said platform structure.

3. The fastening apparatus of claim 1 wherein said non-circular aperture in said platform structure is generally configured in an elongated shape.

4. The fastening apparatus of claim 3 wherein said aperture of said seat element is generally configured in substantially the same elongated shape as said aperture in said platform structure.

5. A fastening apparatus providing a bolt seat through a non-circular aperture in a platform structure for attaching the platform structure to a support element, said aperture having a non-circular edge, said fastening apparatus comprising:
    a seat element having an outer rim conforming substantially to and being larger than the configuration of the edge of said aperture in said platform structure;
    said seat element also having an inner rim defining an aperture through said element, said inner rim of said seat element conforming substantially to the configuration of said aperture through said platform structure;
    said seat element further including flange means extending around and downward from said inner rim of said seat element;
    said flange means including a portion which is adapted to extend into said aperture of said platform structure when said seat element is brought into contact with said platform structure, and said outer rim of said seat element abuts an upper surface of said platform structure to maintain said seat element adjacent to and extending into said aperture in said platform structure;
    fastening means extending through said aperture in said seat element, said aperture in said platform structure, and corresponding apertures in said support element to engage said seat element and said support element and securely hold said platform to said support element.

* * * * *